United States Patent
Kitai

[15] 3,638,544
[45] Feb. 1, 1972

[54] SHUTTER OPERATING MECHANISM

[72] Inventor: Kiyoshi Kitai, 54, Tomihisa-cho, Shingu-ku-ku, Tokyo, Japan

[22] Filed: Dec. 12, 1969

[21] Appl. No.: 884,473

[30] Foreign Application Priority Data

Dec. 16, 1968 Japan...................43/91849

[52] U.S. Cl. ..................95/10 CT, 95/53 EB, 95/63, 95/64
[51] Int. Cl. ........................G03b 7/08, G03b 9/62
[58] Field of Search................95/10 C, 53 R, 53 EL, 64 R, 95/64 C, 63

[56] References Cited

UNITED STATES PATENTS

| | | | |
|---|---|---|---|
| 3,286,610 | 11/1966 | Fahlengerg | 95/10 C |
| 3,318,214 | 5/1967 | Singer et al. | 95/10 C |
| 3,453,942 | 7/1969 | Kiper | 95/64 C X |
| 3,491,670 | 1/1970 | Rentschler | 95/64 R X |
| 3,504,611 | 4/1970 | Richter et al. | 95/63 X |

Primary Examiner—Joseph F. Peters, Jr.
Attorney—Robert E. Burns and Emmanuel J. Lobato

[57] ABSTRACT

A shutter operating mechanism with an electrically controlled shutter has three modes of operation, namely an automatic mode in which the rate of opening of the shutter is controlled by a governor and the exposure time is controlled by a photocell sensing the brightness of the subject being photographed, a semiautomatic mode in which the aperture is set manually and the exposure time is controlled according to the setting for the aperture and the brightness of the subject, and a nonautomatic mode in which both the aperture and exposure time are set manually. Selection is made by concentric rings for controlling aperture and exposure time respectively. Each of the rings can be set for automatic operation or for a selected value.

10 Claims, 4 Drawing Figures 3,638,544

1

SHUTTER OPERATING MECHANISM

The present invention relates to shutter operating mechanisms, for example for cameras, and particularly to a shutter operating mechanism providing optional automatic, semiautomatic and manual control in a convenient manner.

A camera with automatic shutter operating mechanism responsive to the brightness of the subject to be photographed makes it possible to take pictures easily and quickly and without any particular skill. However, it is not suitable for special purposes or for use under abnormal conditions. For example, if the background is unusually bright, a person or object in the foreground will be underexposed. When photographing a moving body, it is desirable to use a larger aperture in order to reduce the exposure time. Conversely, if it is desired to have greater depth of field, the aperture should be reduced and the exposure time correspondingly increase. An automatic shutter does not provide satisfactory results under such conditions.

It is accordingly an object of the present invention to provide a shutter operating mechanism having the advantages of automatic operation without its disadvantages. In accordance with the invention, the shutter operating mechanism provides three modes of control, namely a fully automatic mode in which the rate of opening of the shutter is controlled by a governor and the exposure time is controlled by a photocell sensing the brightness of the subject being photographed, a semiautomatic mode in which the aperture is manually selected and the exposure time is automatically controlled according to the setting of the aperture and the brightness of the subject and a nonautomatic mode in which both the aperture and the exposure time are set manually.

Moreover, in accordance with the invention the selection of the desired mode of operation is conveniently effected merely by suitable setting of the usual aperture control ring and exposure time control ring with which a camera is customarily provided. If fully automatic operation is desired, both rings are set in a position identified as automatic. If it is desired to use a particular aperture for special effects or special conditions, the aperture control ring is set for the opening desired. The exposure time is thereupon automatically determined in accordance with the aperture setting and the brightness of the subject to be photographed. If it is desired to control both the aperture and exposure time manually, the respective control rings are set to the desired values whereupon the shutter operates in a nonautomatic mode. The shutter operating mechanism in accordance with the invention thus provides great flexibility and convenience of operation.

The nature and advantages of the invention will be more fully understood from the following description and claims in conjunction with the accompanying drawings in which:

Figure 1:
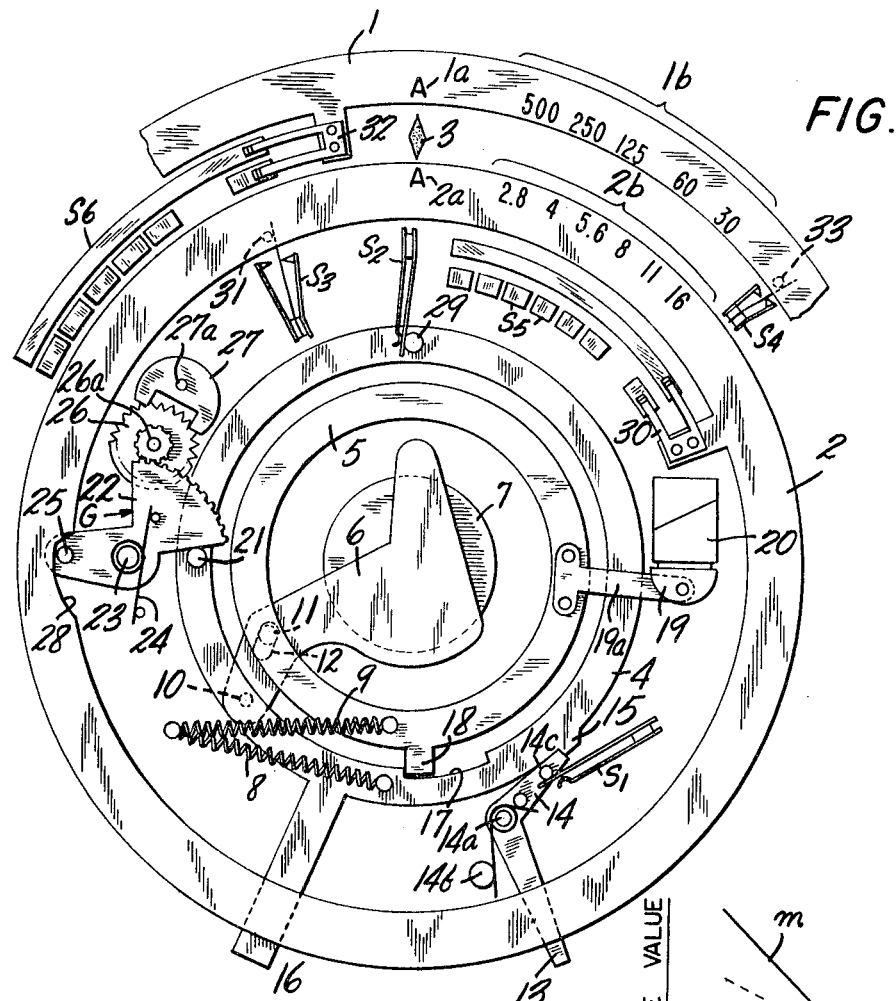
FIG. 1 is a somewhat schematic front view showing the essential parts of a shutter operating mechanism in accordance with the invention.

The shutter operating mechanism illustrated by way of example in FIG. 1 has a rotatable exposure time control ring 1 and an aperture control ring 2 arranged concentrically with one another. The exposure time control ring 1 has an insignia 1a indicating automatic operation and here shown as the letter "A." It also has a scale 1b indicating exposure times, for example, 500, 250, 125, 60, 30 etc. The rotatable aperture control ring 2 has an insignia 2a indicating automatic operation and here shown as the letter "A." It also has a scale 2b of aperture values ranging for instance from a full open aperture of 2.8 to an aperture of 16. Both of the control rings 1 and 2 are rotatably supported for adjustment with reference to an index 3 on the camera cylinder.

2

A shutter for closing the lens aperture 7 is made up of a plurality of sectors 6 of which only one is shown in the drawings. The sectors are operable by a sector opening ring 4 with which each sector is pivotally connected by a pin 10 and a sector closing ring 5 having a pin 11 fitting into a slot 12 of each sector 6. The sector opening ring 4 and sector closing ring 5 are rotatable concentrically of the camera cylinder. The opening ring 4 is biased by a spring 8 to rotate in a clockwise direction to open the shutter. The closing ring 5 is biased by a spring 9 to rotate in a clockwise direction to close the shutter. The opening ring 4 and closing ring 5 are interconnected by a projection 16 on the closing ring received in a recess 17 in the opening ring 4. The recess 17 is of sufficient length to permit limited relative movement of the two rings.

The opening ring 4 is rotatable in a counterclockwise direction by a setting lever 16 to set position where it is releasably held by the engagement of an arm 14 of a release lever 13 with a projection 15 on the opening ring 4. The release lever 13 is pivoted on a pin 14a and is biased in a counterclockwise direction by a spring 14b.

By reason of the engagement of the projection 18 in the recess 17, the setting of the opening ring 4 by means of the lever 16 also rotates the closing ring 5 in a clockwise direction to set position while maintaining a relative position between the rings to keep the shutter closed. Likewise, through the engagement of the projection 18 in the recess 17, the closing ring 5 is held in set position along with the opening ring 4 by the release lever 13. When the closing ring 5 is in set position, an iron armature 19 carried on a projecting arm 19a of the closing ring engages the pole piece an electromagnet 20. If the magnet is energized, it attracts the armature 19 to hold the closing ring 5 in set position when the opening ring 4 is released by the release lever 13. The opening ring is thereby permitted to turn in a clockwise direction under the force of its spring 8 while the closing ring 5 continues to be held in set position as long as the electromagnet 20 is energized. The resulting relative rotation of the rings results in an opening of the shutter.

Means is provided for controlling the opening of the shutter so that it opens at a predetermined rate. The control means is shown as a governor G comprising a gear sector 22 which is rotatable about a pivot shaft 23 on the main body of the shutter and is biased to turn in a clockwise direction by a spring 24. A pin 21 on the shutter opening ring 4 is engageable with the gear sector 22 to turn the gear sector in a counterclockwise direction against the bias of its spring 24 when the opening ring 4 is released from set position by the release lever 13. The gear sector 22 meshes with the pinion 26a of a second wheel 26 having teeth engageable with an escapement 27 pivoted to oscillate about a pin 27a so as to control the rate of rotation of the wheel 26 and thereby control the rate of opening of the shutter. A pin 25 on an arm of the gear sector 22 is positioned in a cam notch 28 in the aperture control ring 2 so as to permit operation of the governor in the manner described when the ring 2 is in automatic position as illustrated in FIG. 1. When the aperture control ring 2 is turned in a counterclockwise direction to a nonautomatic position in which one of the aperture indications 2.8–16 registers with the index 3, the gear sector 22 is rotated in a counterclockwise direction by engagement of a cam edge portion of the notch 28 in the ring 2 with the pin 25 on the arm of gear sector 22 so that the gear sector is moved out of the path or range of movement of the pin 21 on the shutter opening ring 4. The governor G is thereby disabled.

The shutter mechanism is provided with suitable means for controlling the aperture opening by means of the aperture control ring 2, for example by limiting the opening of the shutter or by providing a separate adjustable diaphragm. As such means is well known it is not shown in the drawing.

The electrical circuit which will be described below includes a number of switches and electrical contacts associated with the shutter mechanism. The switches include a normally open electric source switch S1 having a spring contact engageable by a pin 14c on the arm 14 of the release lever 13 to close the switch when the release lever is moved in a clockwise direction from set position to release the shutter opening ring 4. The switch S1 is thus closed at the beginning of the shutter opening operation.

A normally open timing switch S2 has a spring contact engageably by a pin 29 on the shutter opening ring 4 to hold the switch closed when the opening ring is in set position. When the opening ring 4 is released and starts to move in a clockwise direction, the pin 29 is disengaged from the spring contact of the timing switch S2 and the switch is thereby opened.

A two-way sensitivity changeover switch S3 has a movable contact shown in the form of a spring blade which is movable between two stationary contacts and is spring biased to engage the left hand stationary contact as viewed in FIG. 1. A pin 31 on the aperture control ring 2 is engageable with the movable contact of the changeover switch S3 to hold it in engagement with the right-hand contact when the control ring is set in automatic position with the indication "A" set at the index 3. When the control ring 2 is moved in a counterclockwise direction to a nonautomatic position, the movable contact of the switch S3 is released by the pin 31 to engage the opposite stationary contact.

A two-way exposure changeover switch S4 has a movable contact shown in the form of a spring blade which is movable between two stationary contacts and is spring biased to engage the left-hand stationary contact as shown in FIG. 1. A pin 33 on the exposure time control ring 1 is engageable with the movable contact of the changeover switch S4 to hold it in engagement with the right-hand contact when the ring 1 is set in automatic position with the indication "A" set at the index 3. When the exposure time control ring 1 is moved in a counterclockwise direction to a nonautomatic position, the pin 33 disengages the movable contact of the switch S4 which is thereby released to engage the left-hand stationary contact.

Figure 2:
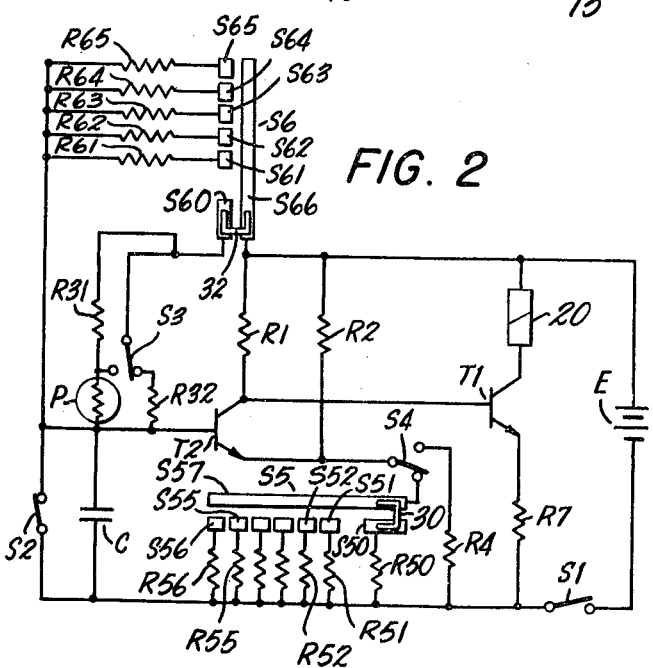
FIG. 2 is a wiring diagram of a timing circuit controlling operation of the shutter.

The aperture control ring 2 is further provided with a sliding contact piece 30 which slides over an aperture setting changeover switch S5 comprising a plurality of multistep contact points S50 to S56 and a slip ring S57 (FIG. 2). The sliding contact piece 30 engages the slip ring S57 and one or another of the contacts S50 to S56 depending on the position of the ring. When the aperture control ring 2 is in automatic position the slider 30 engages contact S50. When it is in a nonautomatic position, it engages one of the contacts S51 to S56 corresponding to the value of the aperture for which the ring is set according to the scale 2b provided on the ring, it being understood that the positions of the contacts correspond to the calibrations of the scale.

The exposure time control ring 1 is similarly provided with a sliding contact piece 32 that slides on an exposure time setting switch S6 comprising a plurality of contact points S60 to S65 and a slip ring S66. The sliding contact piece 32 engages the slip ring S66 and one or another of the contacts S60 to S65 depending on the position of the ring. When the exposure time control ring 1 is in automatic position, the contact piece S32 engages contact S60. When it is in a nonautomatic position the sliding contact piece 32 engages one or another of the contacts S61 to S65 depending on the exposure time for which the ring is set according to the scale 1b provided on the ring, it being understood that the positions of the contacts correspond to the calibrations of the scale.

In addition to the electromagnet 20 and the above mentioned switches S1 to S6, the timing circuit shown by way of example in FIG. 2 includes an electric current source shown as a battery E, two transistors T1 and T2, a timing capacitor C and a photoelectric element P, for example a photoresistor such as a CdS cell. A resistance R31 is connected in series with the photoelectric element P, the capacitor C and the electrical source switch S1 between the contact S60 of the exposure time setting switch S6 and the negative terminal of the battery. When the exposure time control ring 1 is in automatic position, the contact S60 is connected by the sliding contact piece 32 with the positive terminal of the battery. A resistance R32 is connected by means of the sensitivity changeover switch S3 in such manner that when the switch is in one position, the resistance 32 is connected in parallel with the resistance R31 and photoelectric element P while in the other position the resistance R31 is short circuited and the resistance R32 is disconnected. Moreover, a group of resistances R61 to R65 are connected respectively between the contacts S61 to S65 of the exposure time setting switch S6 and the point of connection between the photoelectric element P and the condenser C. The resistance R61 to R65 are of different values calibrated according to the exposure time corresponding to the contacts S61 to S65 respectively. Hence, when the sliding contact piece R32 carried by the exposure time control ring 1 is disengaged from the contact S60 and engages one or another of the contacts S61 to S65, the corresponding resistance R61 to R65 is connected in series with the capacitor C, and the photoelectric element P is disconnected. The timing switch S2 is connected in parallel with the capacitor C so that when the switch is closed the capacitor is short-circuited and hence discharged.

The connecting point between the photoelectric element P and the condenser C is connected to the base of the transistor T2, the collector of which is connected to the positive terminal of the battery E through a resistance R1. The emitter of the transistor is connected to the positive terminal of the battery E through a resistance R2 and also to the movable contact of the exposure changeover switch S4. When the switch S4 is in one position, the emitter of the transistor T2 is connected to the negative terminal of the battery E through a resistance R4. When the switch S4 is in the other position, the emitter of the transistor T2 is connected to the negative terminal of the battery E through the aperture setting changeover switch S5 and one or another of resistances R50 to R56 connected respectively to the contacts S50 to S56 of the switch S5, the resistance selected depending on the position of the sliding contact 30 and hence on the setting of the aperture control ring 2. The resistances R50 to R56 are of different values, the resistance R50 being suitable for automatic operation and the resistances R51 to R56 being calibrated according to the values of the corresponding aperture settings.

The base of the transistor T1 is connected to the collector of transistor T2 while the collector is connected through the electromagnet 20 to the positive terminal of the battery E. The emitter of the transistor T1 is connected to the negative terminal of the battery through a resistance R7 and the electrical source switch S1. Hence, the electromagnet is energized when the switch S1 is closed and the transistor T1 is in a conducting condition.

AUTOMATIC OPERATION

Figure 3:
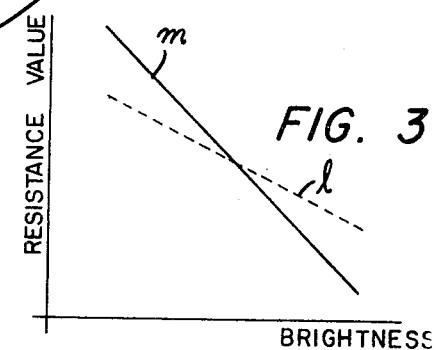
FIG. 3 is an explanatory figure showing the characteristics of the photoelectric element of the timing circuit when the shutter is set for automatic exposure and for semiautomatic exposure respectively.

In order to set the shutter operating mechanism for a program-type automatic exposure, the exposure time control ring 1 and aperture control ring 2 are both adjusted so that the automatic indicating marks 1a and 2a coincide with the index 3. With the rings in this position, the movable contact of the exposure changeover switch S4 is held by the pin 33 on the exposure time control ring 1 in position to engage the stationary contact on the right as seen in FIG. 1 and lower contact as seen in FIG. 2. The sliding contact piece 32 is in position to engage the contact S60 connected through the resistance 31 to the photoelectric element P. The movable contact of the sensitivity changeover switch S3 is engaged by the pin 31 on the aperture control ring 2 so as to hold it in engagement wit the right-hand contact as seen in FIGS. 1 and 2. The resistance R32 is thus connected in parallel with the series connected resistance R31 and photoelectric element P. The resistance value of the resistance group thus connected has the characteristic shown by the broken line 1 in FIG. 3 where the resistance value is plotted against the brightness of the subject to be photographed. The sliding contact piece 30 of the aperture setting changeover switch S5 is in engagement with the contact S50 so that the emitter of the transistor T2 is connected with the negative terminal of the battery through the resistance R50 and the electric source switch S1. Since the notch recess 28 of the aperture control ring 2 is in position to receive the pin 25 on the arm of the gear sector 22 of the speed governor G, the sector 22 is in position to be engaged by the pin 21 carried by the shutter opening ring 4. The speed governor is thus in an operable condition.

The shutter mechanism is set by moving the setting lever 16 in a counterclockwise direction. By reason of the projection 18 of the closing ring 5 fitting into the notch 17 of the opening ring 4 both rings 4 and 5 are rotated in a counterclockwise direction by the setting lever 16, thereby energizing the springs 8 and 9 while keeping the shutter 6 in a closed state. When the opening ring 4 reaches its set position, the arm 14 of the release lever 13 engages the projection 15 to hold the opening ring 4 and thereby also the closing ring 5 in set position. At this time the armature 19 carried by the closing ring 5 contacts with the magnetic pole of the electromagnet 20 and the pin 29 on the opening ring 4 closes the timing switch S2 so as to short circuit the capacitor C. The parts are thereby brought to the position shown in FIG. 1.

Figure 4:
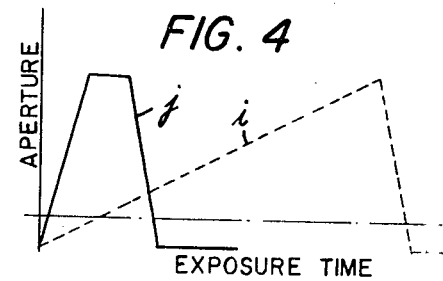
FIG. 4 is an explanatory figure showing the opening and closing action of the shutter in automatic and semiautomatic modes of operation.

When it is desired to take a picture, the release lever 13 is rotated in a clockwise direction so that its arm 14 disengages the projection 15 of the opening ring 4 which is thereby released to rotate in a clockwise direction under the pull of the spring 8 at a speed controlled by the governor G. Movement of the release lever 13 in a clockwise direction also closes the electric source switch S1 by means of the pin 14c. Since the transistor T1 is at this time in a conductive state, current flows through the electromagnet 20 which attracts the armature 19 to hold the shutter closing ring 5 against rotation. As the shutter opening ring 4 starts to turn in a clockwise direction, the pin 29 disengages the timing switch S2 which is hence opened whereupon the condenser starts to charge by current flowing through the photoelectric element P and the resistance R32. The rate of charging depends on the resistance of the photoelectric element P—together with the values of resistances 31 and 32—and hence depends on the brightness of the subject to be photographed. As the base potential of the transistor T2 is still low, this transistor is in a nonconductive state so that the transistor T1 remains in a conductive state as described above. The electromagnet 20 is thus kept energized to hold the closing ring 5 in set position as the opening ring 4 continues to rotate in a clockwise direction under the control of the governor G thereby providing a programmed opening of the shutter as indicated by the dotted line $i$ in FIG. 4.

When the capacitor C is charged up to a predetermined potential by the current flowing through the resistance group containing the photoelectric element P and the resistances R31 and R32, the transistor T2 becomes conductive whereupon the transistor T1 becomes nonconductive so that the excitation current of the electromagnet 20 is cut off. The operating point of the transistor T2 is determined by the value of the resistance R50 in the emitter circuit of the transistor. When the magnet is deenergized, it releases the armature 19 whereupon the closing ring 5 is rotated rapidly in a clockwise direction by the spring 9 to close the shutter as represented by the right hand portion of the dotted line $i$ in FIG. 4. As will be seen from this curve, the shutter opens progressively and closes rapidly. An exposure in the automatic mode of operation is thereby completed.

SEMIAUTOMATIC OPERATION

In a semiautomatic mode of operation of the shutter operating mechanism of the present invention, the aperture is set manually and the exposure time is controlled jointly by the brightness of the subject and the aperture selected. The exposure time control ring 1 is set in automatic position as before. However, the aperture control ring 2 is turned in a counterclockwise direction from the position shown in FIG. 1 to bring one or another of the aperture indicating markings of the scale 2b into registry with the index 3. By mechanism which is well known in the art and is hence not shown in the drawing the ring 2 controls either the size of the lens opening 7 or the extent to which the shutter 6 can be opened so as to provide an aperture of the desired size corresponding to the markings on the scale 2b. Rotation of the aperture control ring 2 in a counterclockwise direction from the position shown in FIG. 1 causes the pin 31 carried by the ring 2 to release the movable contact of the sensitivity changeover switch S3 so that it engages the stationary contact on the left side as viewed in FIGS. 1 and 2. The series resistance R31 is thereby short-circuited and the parallel resistance R32 is thereby disconnected so that only the photoelectric element P is connected in series with the capacitor C. As a result, the resistance characteristic with respect to the brightness of the subject to be photographed has a steeper inclination as shown by the full line $m$ in FIG. 3. This change in brightness-resistance characteristic is made by reason of the fact that in the case of a program-type automatic exposure the change in resistance value brings about changes of aperture opening and exposure time simultaneously while in the case of semiautomatic exposure with optional aperture, the aperture is always maintained at the selected value and the resistance of the photoelectric element affects only the exposure time.

When the aperture control ring 2 is turned to bring one of the aperture markings of the scale 2b into registry with the index 3, a cam surface of the notched concave part 28 of the ring engages the pin 25 so as to turn the gear sector 22 of the governor G in a clockwise direction and thereby out of the locus of movement of the pin 21 on the shutter opening ring 4. The governor is thereby disabled so that it does not retard the opening movement of the shutter opening ring 4.

Moreover, the sliding contact piece 30 of the aperture setting changeover switch S5 is shifted from the contact S50 to one or another of the contacts S51 to S56 depending on the setting of the aperture control ring 2. Hence, the corresponding one of the resistances R51 to R56 is connected in the emitter circuit of the transistor T2 instead of the resistance R50, thereby determining the operating point of the transistor T2 corresponding to the aperture value for which the control ring 2 is set.

When the release lever 13 is rotated in a clockwise direction to release the opening ring 4 after it has been set in the manner described above, the electric source switch S1 is closed and the opening ring 4 is rotated rapidly in a clockwise direction by its spring 8 to the selected opening without being braked by the governor G. As the manner of providing an aperture of the desired size either by limiting the opening of the shutter or providing a separate iris diaphragm operated by the aperture control ring 2 is well known, it is not here described.

Upon closing of the electric source switch S1, the electromagnet 20 is energized so that the shutter closing ring 5 is held in set position by the armature 19. As the shutter opening ring 4 starts to rotate in a clockwise direction, the timing switch S2 is opened and current passing through the photoelectric element P charges the capacitor C. When the voltage of the condenser reaches the switching point of the transistor T2 as determined by the resistance R51 to R56 selected by the setting of the aperture control ring 2, the transistor T2 becomes conductive and the transistor T1 becomes nonconductive so that the excitation current of the electromagnet 20 is cut off. The closing ring 5 is thereby released for rapid rotation in a clockwise direction by its spring 9 to close the shutter. The opening and closing of the shutter is represented by the full line $j$ in FIG. 4 where shutter opening is plotted against exposure time. It will be seen that because of the connection described, the exposure time is determined by the brightness of the subject as sensed by the photoelectric element P and by the resistance value of the resistance R51 to R56 selected by the aperture setting of the aperture control ring 2.

MANUAL OPERATION

If it is desired to make an exposure by setting both the aperture and the exposure time manually, the exposure time control ring 1 is rotated in a counterclockwise direction from the position shown in FIG. 1 to bring one or another of the exposure time markings of the scale 1b into registry with the index 3 and the aperture control ring 2 is likewise turned in a counterclockwise direction from the position shown in FIG. 1 to bring one or another of the aperture values of scale 2b into registry with the index 3. By this setting of the exposure time control ring 1, the pin 33 is disengaged from the movable contact of the exposure changeover switch S4 so that it engages the stationary contact which is at the left in FIG. 1 and is the upper contact in FIG. 2. The aperture setting changeover switch S5 and hence the resistances R50 to R56 are disconnected and the standard setting resistance R4 is connected in the emitter circuit of the transistor T2. Moreover, the sliding contact piece 32 carried by the exposure time control ring 1 is shifted from the contact S60 to one or another of the contacts S61 to S65 according to the setting of the exposure time. This results in disconnecting the photoelectric element P and its associated resistances R31 and R32 and connecting one or another of the resistances R61 to R65 in series with the capacitor C. The charging rate of the capacitor is thereby controlled by the selected resistance R61 to R65 independently of the brightness of the subject.

The setting of the aperture control ring 2 in a nonautomatic position with one or another of the aperture values of scale 2b in registry with the index 3 has the same effect as described above with respect to disabling the governor G. While the sensitivity changeover switch S3 and the aperture setting changeover switch S5 are also actuated as described in connection with the semiautomatic operation, such actuation is without effect since the switches S3 and S5 are disconnected by the exposure time setting switch S4 respectively.

When the shutter opening ring 4 is released from set position by actuation of the release lever 13, the operation is the same as described above with respect to the semiautomatic mode except that the rate of charging of the capacitor C is controlled by one of the resistances R61 to R65 selected by the setting of the exposure control ring 1 and the changeover point of the transistor T2 depends on the resistance value of the resistance R4 rather than one of the resistances R51 to R56. Hence, the exposure time is determined by the setting of the exposure time control ring 1 rather than by the brightness of the subject as sensed by the photoelectric element P or the setting of the aperture control ring 2.

While a preferred embodiment of the invention has been particularly described, it will be understood that the invention is in no way limited to the precise structure and circuitry illustrated by way of example in the drawings. For example instead of varying resistance values in the RC circuitry controlling the time delay, capacitance values can be changed in accordance with well-known practice.

It will thus be seen that the shutter operating mechanism in accordance with the invention makes possible a convenient changeover between a program-type automatic exposure mode of operation, a semiautomatic mode of operation with manual control of the aperture and a nonautomatic mode of operation in which both the aperture and the exposure time are manually controlled while utilizing the same electronic shutter mechanism. Moreover, selection of the mode of operation is conveniently achieved merely by suitable setting of the exposure time control ring and the aperture control ring of the camera. Flexibility and convenience of operation are thus provided.

I claim:

1. A shutter operating mechanism comprising a shutter movable between open and closed positions, a movable shutter opening member connected with said shutter and spring biased to move in a shutter opening direction, means for releasably holding said shutter opening member in set position with the shutter in closed position, a movable shutter closing member connected with said shutter and spring biased to move in a shutter closing direction, electrically releasable means for holding said closing member in set position, an aperture control member selectively settable in a position for automatic shutter operation or in any of a plurality of semiautomatic positions for different aperture openings, means for controlling the rate of opening of the shutter upon release of said shutter opening member when said aperture control member is in automatic position, timing circuit means controlling the release of said shutter closing member by said electrically releasable means including a timing switch means operable upon release of said shutter opening member and time delay means operable to release said shutter closing member a selected time period after actuation of said timing switch, said time delay means comprising a photosensitive element, a capacitance and resistance, and selector means controlled by the setting of said aperture control member is set in automatic position, and to control said time period jointly by said photosensitive element and the setting of said aperture control member when said aperture control member is set in a selected semiautomatic position.

2. Shutter opening mechanism according to claim 1, in which said means controlling the rate of opening of the shutter comprises a governor comprising a gear train and an escapement mechanism.

3. Shutter operating mechanism according to claim 1, comprising means actuated by said aperture control member for disabling said means controlling the rate of opening of the shutter when said aperture control member is set in a semiautomatic position.

4. Shutter operating mechanism according to claim 1, in which said electrically releasable means comprises an electromagnet, and in which said timing circuit means comprises at least one transistor controlling the flow of current in said electromagnet, the conduction of said transistor being controlled by said time delay means.

5. Shutter operating mechanism according to claim 4, in which said timing circuit means comprises a resistor adapted to be connected in parallel with said photosensitive element, and in which a switch means actuated by said aperture control member is operable to connect said resistor in parallel with said photosensitive element when said aperture control member is in automatic position and for disconnecting said resistor when aperture control member is in a semiautomatic position.

6. Shutter operating mechanism according to claim 4, in which said timing circuit means comprises a plurality of resistors of different value and switching means actuated by said aperture control member to connect said resistors selectively into circuit with said capacitance to vary said time period according to selected semiautomatic settings of said aperture control member and the light sensed by said photosensitive element.

7. A shutter operating mechanism comprising a shutter movable between open and closed position, a movable shutter opening member connected with said shutter and spring biased to move in a shutter opening direction, means for releasably holding said shutter opening member in set position with the shutter in closed position, a movable shutter closing member connected with said shutter and spring biased to move in a shutter closing direction, electrically releasable means for holding said closing member in set position, an exposure time control member settable in a position for automatic shutter operation or in any of a plurality of nonautomatic positions for different exposure times, an aperture control member selectively settable in a position for automatic shutter operation or in any of a plurality of nonautomatic positions for different aperture openings, means for controlling the rate of opening of the shutter upon release of said shutter opening member when said aperture control member is in automatic position, timing circuit means controlling the release of said shutter closing member by said electrically releasable means including a timing switch means operable upon release of said shutter opening member and time delay means operable to release said shutter closing member a selected time period after actuation of said timing switch, said time delay means comprising a photosensitive element, a capacitance and resistance, and selector means controlled by the settings of said exposure time control member and said aperture control member to control said aperture opening and said time period by said photosensitive element when said exposure time control member and said aperture control member are both set in automatic position, to control said time period jointly by said photosensitive element and the setting of said aperture control member when said exposure time control member is set in automatic position and said aperture control member is set in a selected nonautomatic position, and to control said time period by the setting of said exposure time control member only when each of said control members is set in a selected nonautomatic position.

8. Shutter operating mechanism according to claim 7, in which said timing circuit means comprises a plurality of resistors of different value and switching means actuated by said exposure time control member to connect said resistors selectively into circuit with said capacitance to vary said time period according to selected nonautomatic settings of said exposure time control member.

9. Shutter operating mechanism according to claim 7, in which said timing circuit means comprises a plurality of resistors of different values and switching means actuated by said aperture control member to connect said resistors selectively into circuit with said capacitance to vary said time period according to selected settings of said aperture control member.

10. Shutter operating mechanism according to claim 9, in which said timing circuit means comprises a switch means actuated by said exposure time control member for disconnecting said resistors when said exposure time control member is in a nonautomatic position.

* * * * *